United States Patent
Phillips

(10) Patent No.: US 6,834,956 B2
(45) Date of Patent: Dec. 28, 2004

(54) THERMOFORMABLE POLARIZED LENS WITH SUBSTRATE HAVING ADJUSTED GLASS TRANSITION TEMPERATURE

(75) Inventor: Richard A. Phillips, South Dartmouth, MA (US)

(73) Assignee: International Polarizer, Inc., Marlborough, MA (US)

( * ) Notice: Subject to any disclaimer, the term of this patent is extended or adjusted under 35 U.S.C. 154(b) by 0 days.

(21) Appl. No.: 10/331,062

(22) Filed: Dec. 27, 2002

(65) Prior Publication Data

US 2004/0125339 A1 Jul. 1, 2004

(51) Int. Cl.[7] ................................................ G02C 7/10
(52) U.S. Cl. ...................... 351/163; 351/49; 351/166
(58) Field of Search ......................... 351/44, 49, 163, 351/165, 166; 359/487–9, 502, 490–94, 497–500

(56) References Cited

U.S. PATENT DOCUMENTS

| | | | |
|---|---|---|---|
| 5,051,309 A | 9/1991 | Kawaki et al. | 428/332 |
| 5,164,228 A | 11/1992 | Peralta | 427/164 |
| 5,246,499 A | 9/1993 | Peralta | 118/641 |
| 5,246,728 A | 9/1993 | Rodriquez | 427/2 |
| 5,286,419 A | 2/1994 | van Ligten | 264/1.32 |
| 5,351,100 A | 9/1994 | Schwenzfeier et al. | 351/164 |
| 5,410,014 A | 4/1995 | Haese et al. | 528/196 |
| 5,434,707 A | 7/1995 | Dalzell et al. | 359/485 |
| 5,550,599 A | 8/1996 | Jannard | 351/159 |
| 5,648,832 A | 7/1997 | Houston et al. | 351/159 |
| 5,654,380 A | 8/1997 | Kawai et al. | 525/439 |
| 5,689,323 A | 11/1997 | Houston et al. | 351/41 |
| 5,753,145 A * | 5/1998 | Teng et al. | 252/585 |
| 5,815,848 A | 10/1998 | Jarvis | 2/424 |
| 5,963,293 A | 10/1999 | Jannard | 351/45 |
| 6,010,218 A | 1/2000 | Houston et al. | 351/159 |
| 6,038,705 A | 3/2000 | Jarvis | 2/424 |
| 6,168,271 B1 | 1/2001 | Houston et al. | 351/41 |
| 6,220,703 B1 | 4/2001 | Evans | 351/163 |
| 6,256,152 B1 | 7/2001 | Coldrey et al. | 359/642 |
| 6,270,698 B1 | 8/2001 | Pope | 264/22 |
| 6,328,446 B1 | 12/2001 | Bhalakia et al. | 351/163 |
| 6,392,802 B2 * | 5/2002 | Miyatake et al. | 359/494 |
| 6,627,300 B1 * | 9/2003 | Kent et al. | 428/212 |
| 6,641,900 B2 * | 11/2003 | Hebrink et al. | 428/212 |
| 6,659,608 B2 * | 12/2003 | Yamamoto et al. | 351/163 |
| 2001/0019182 A1 * | 9/2001 | Hebrink et al. | 264/1.6 |
| 2003/0090619 A1 * | 5/2003 | Kumagai et al. | 349/194 |
| 2003/0118750 A1 * | 6/2003 | Bourdelais et al. | 428/1.3 |

OTHER PUBLICATIONS

U.S. patent application Publication US 2002/0044352, Apr. 18, 2002.

* cited by examiner

Primary Examiner—Jordan M. Schwartz
Assistant Examiner—Jessica Stultz
(74) Attorney, Agent, or Firm—Downs Rachlin Martin PLLC

(57) ABSTRACT

An article formed by combining a polarizing layer, and a substrate composed of a blend of polymers such that the glass transition temperature of the substrate is adjusted to the vicinity of 100° C. This permits the lens to be thermoformed at temperatures in the vicinity of 100° C., which preserves the integrity of the polarizer. The article can be used as a standalone lens or as a polarizing insert for an injection-molded lens via an injection/compression coining process that results in minimal stress in the lens.

4 Claims, 3 Drawing Sheets

THERMOFORMABLE POLARIZED LENS WITH SUBSTRATE HAVING ADJUSTED GLASS TRANSITION TEMPERATURE

CROSS-REFERENCE TO RELATED APPLICATIONS

This patent application is related to U.S. patent applications Ser. Nos. 10/281,623 and 10/281,669, filed on Oct. 28, 2002, which patent applications are incorporated by reference herein.

FIELD OF THE INVENTION

The present invention pertains to polarized lenses, and in particular to polarized high-impact-polymer lenses manufactured by combining a polarizing layer with a substrate having an adjusted glass transition temperature

BACKGROUND OF THE INVENTION

Polarized lenses for eyewear have been in use for over 50 years (see, e.g., U.S. Pat. No. 2,237,567 to Land, and U.S. Pat. No. 2,445,555 to Binda). Polarized lenses can selectively eliminate glare that originates from the reflection and subsequent polarization of light from flat surfaces such a pavement, water, sand or snow. Thus, polarized lenses are particularly useful for outdoor activities such as driving, fishing, sailing, sunbathing, and skiing.

One popular type of polarized lens is formed from a sheet polarizer, which is a thin layer of polyvinyl alcohol sandwiched between two layers of a cellulosic film, such as cellulose acetobutyrate or cellulose triacetate. Although sheet polarizer lenses are light-weight and inexpensive to produce, they deform easily, are not highly impact resistant, and have no corrective power (i.e., are plano).

Many popular and economical polarized lenses are based on iodine-. Others are based on dichroic dyes. Iodine polarizers have high polarizing efficiency. Dichroic dyes are typically less efficient but have higher temperature stability and higher moisture resistance than iodine-based polarizers.

Early improvements in the lenses involved placing a wafer of sheet polarizer inside of a mold, and casting CR39 monomer around the wafer. U.S. Pat. No. 4,090,830 to LaLiberte describes this casting process. The mold is then placed in a water bath and cured at varying temperature for 12 to 24 hours during which time the monomer polymerizes into a hard precisely curved shape. An improvement to this process is described in U.S. Pat. No. 3,940,304 to Schuler. The improvement involves coating a polarizing wafer with a thin tie coat of melamine formaldehyde, thermoforming it to match the curvature of one of the mold surfaces, and placing it inside of the mold before it is filled with CR39 monomer. The resulting lens is polarized and can be either piano, or a prescription lens with power. CR39 lenses are hard but do not have high impact resistance. They are suitable for dress eyewear, but not for sport applications or for children who engage in rough and tumble play.

Another process of forming a polarizing lens is described in U.S. Pat. No. 6,328,446 to Bhalakia et al. and involves laminating the polarizing wafer onto the front of an existing lens. However it has been frequently found that the lamination process is difficult and results in a low yield. A common problem encountered by this laminating approach is that variations in the thickness of the single layer of adhesive can lead to distortion. Moreover, laminations are particularly difficult with lenses that have different curvatures in different parts of the surface, such as occurs in bifocal or progressive powered lenses.

Another process for forming a polarized lens is described in U.S. Pat. No. 6,334,681 to Perrott et al. and in U.S. Pat. No. 6,256,15 Coldray et al. The process involves laminating the polarizing wafer between two optical members. This approach is more costly than that involving a single optical member, though it has the advantage of the polarizer being well protected between the optical members. Optical distortion, caused by variations in the curvature of the polarizing wafer, are canceled out by variations in the thickness of the adhesive, provided that the index refraction of the polarizer matches that of the adhesive.

More recently, U.S. Pat. No. 5,051,309 to Kawaki et al. discloses a polarized lens in which the polarizing layer is sandwiched between two sheets of polycarbonate. The polycarbonate is stretched, resulting in high stress and thus high birefringence. The stretch axis is aligned with the absorption axis of the polarizer. The birefringence of the polycarbonate is not noticed when viewing the lens perpendicular to its surface. However when viewed at an angle to its surface, the high birefringence causes interference fringes. By using highly stretched polycarbonate, the fringes are high order and washed out and so are not noticeable by the user of the lens. The resulting sandwich of polycarbonate is then thermoformed. Polycarbonate requires higher temperatures and longer times to thermoform than do cellulosic films. The polarizer is preferably a dichroic polarizer, which can withstand the higher temperatures, although some iodine may be included to improve the polarizing efficiency.

Although polycarbonate is known for high impact resistance, its strength is reduced by internal stresses. Thus, to meet impact tests for safety glasses, certain polycarbonate lenses are made 2.4 mm thick. However, when such lenses are mounted in eyeglass frames with a wraparound design, they have residual power and prismatic effects. The lenses often do not meet the European Class 1 standards and fall into the Class 2 category. This characterization of the lenses as "second class" is a drawback.

One approach to forming lenses from polycarbonate is to use thermoformed polycarbonate sheet as inserts and then injection molding polycarbonate around the sheet. Since each side of the injection mold can be precisely made, the resulting lens has no unwanted power or prismatic effect. By correctly designing the mold surfaces, prescription ophthalmic lenses of any desired power can be manufactured. The bond between the polycarbonate polarizer and the injected polycarbonate is quite strong. However, conventional injection molding introduces considerable stress into the molded parts. This stress adds to the stress in the thermoformed polycarbonate insert. Accordingly, great care must be taken in mounting these lenses in frames so that the lens fits the frame groove exactly. Otherwise, additional stress is introduced by the frame, which can cause crazing of the lens edges and birefringent stress patterns when the lens is viewed off-axis.

Another process is described in U.S. Pat. No. 5,434,707 by Dalzell et al. in which a polarizer consisting of a polarizing PVA layer bonded to CAB or CTA on one or both sides is attached to a layer of acrylic polymer. The assembly is then press polished between a male and female platen, the curvatures of the platens being different and selected so that the optical power of the assembly is essentially zero.

SUMMARY OF THE INVENTION

An aspect of the invention is an article comprising a polarizer combined with a substrate. The substrate includes of a blend of polymers such that the glass transition temperature of the substrate is lowered ("adjusted") compared to that of a single-polymer substrate. This enables the composite polarizer-substrate assembly to be thermoformed at a lower temperature than otherwise possible. The article can be used to form a plano lens or an ophthalmic lens.

The composite assembly of the polarizer plus one or more layers of polymer blend can serve as a polarizing insert for a molded article such as a lens. The polarizing insert is formed (e.g., thermoformed) to have a curvature corresponding to a surface of an injection mold. A high-impact polymer may then be formed around the polarizing insert by a either conventional injection molding, or by a two-step injection/compression process of injection molding that results in minimal stress in the polarizing insert and the high-impact polymer. The high impact polymer includes, in an example embodiment, a blend of polymers with a lower glass transition temperature than a single (i.e., non-blended) polymer.

Another aspect of the invention is a polarized lens product formed by a process that includes providing a polarizer, and bonding the polarizer to a substrate to form a composite structure. The substrate is formed from a blend of polymers having glass transition temperature that allows the composite structure to be thermoformed at temperatures in the vicinity of 100° C. The composite structure is then thermoformed to create either a plano or an ophthalmic lens. In an example embodiment, a hard coating is added to one or both sides of the lens to resist scratching.

The thermoformed structure can be used as an insert in an injection molded lens.

BRIEF DESCRIPTION OF THE DRAWING

FIG. 4 is similar to FIG. 2, except that an injection molded layer is formed on the concave side of the substrate, and hard coat layers are formed on the inner and outer surfaces of the lens to form an impact-resistant and scratch-resistant lens; and.

DETAILED DESCRIPTION

In the following detailed description of the embodiments of the invention, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The present invention includes a polarized lens comprised of a polarizing layer and a substrate whose glass transition temperature has been lowered by blending two or more polymers. In an example embodiment, the polarized lens is piano (i.e., has no power or small negative power as measured in diopters.). In another example embodiment, the lens serves as an insert for a molded lens, for example, as an ophthalmic prescription lens.

The preferred injection molding process used in making the polarized lens of the present invention is described in U.S. Pat. No. 6,270,698 to Pope ("the Pope patent"), entitled "Stress-relieved acrylic optical lenses and methods for manufacture by injection coin molding," which patent is incorporated herein by reference. The injection molding process of the Pope patent includes two steps: a conventional injection step, followed a compression (or coining) step. Thus, the injection molding process of the Pope patent is referred to hereinafter as "the injection/compression coining process."

Figure 1:
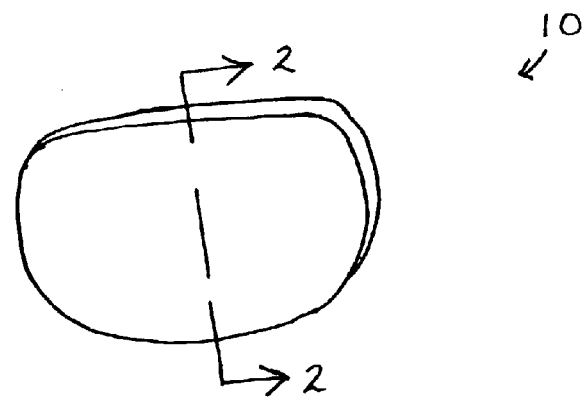
FIG. 1 is a perspective view of the article of the present invention.
Figure 2:
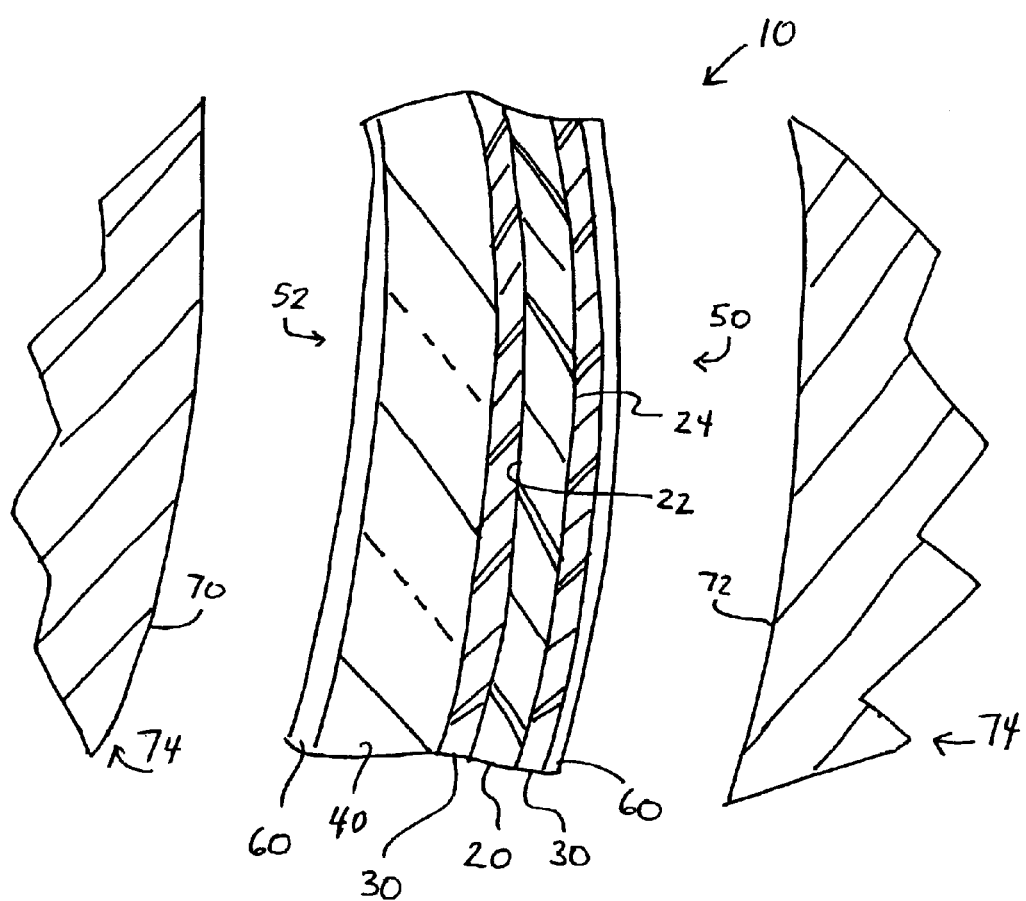
FIG. 2 is a partial cross-sectional diagram of the article of FIG. 1 taken across the line 2—2, illustrating an example embodiment of the article having a polarizer, an optional layer of cellulosic material on each side of the polarizer, and a substrate bonded to one of the cellulosic material layers.

FIG. 1 is a perspective view of the article of the present invention, and FIG. 2 is a cross-section view of the article taken along the line 2—2. With reference to FIG. 2, in an example embodiment of the invention, article 10 includes a polarizing layer 20, e.g., in the form of a polarized sheet or wafer. Polarizing layer 20 has first and second sides (surfaces) 22 and 24. In a preferred example embodiment, polarizer 20 is iodine-based. In another example embodiments, polarizer 20 is a dichroic dye polarizer, polyvinylene (i.e., "k-sheet"), or polyacetelyne. It will be apparent to those skilled in the art that a number of known polarizer films can be utilized in the present invention and that the above constitutes only a partial list by way of providing a few examples. In an example embodiment, polarizer 20 has a total thickness between 0.01 mm and 0.08 mm.

In an example embodiment, polarizer 20 is optionally sandwiched between two layers 30 of cellulosic material (e.g., in the form of a film). In an example embodiment, the cellulosic material is cellulose aceto butyrate. In an example embodiment, the thickness of each cellulosic layer 30 is in the range between 0.003 inch and 0.045 inch, and further in an example embodiment is about 0.029 inch thick.

Figure 3:
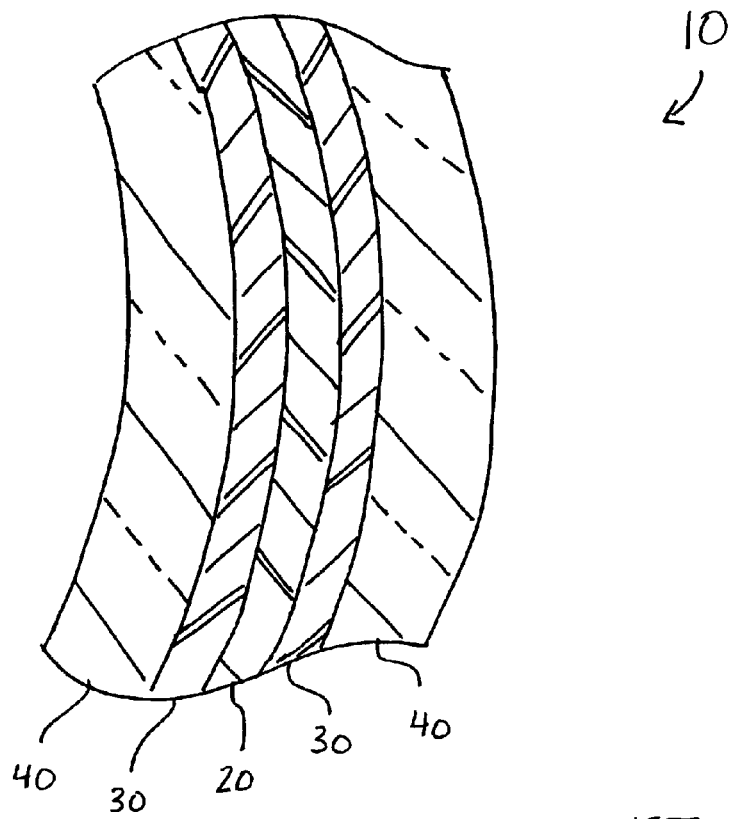
FIG. 3 is similar to FIG. 2, except that a second substrate is bonded to the remaining cellulosic material layer.

In an example embodiment, article 10 includes an impact-resistant substrate 40 bonded to one side of the polarizer, or alternatively to one of cellulosic layers 30. In another example embodiment as illustrated in FIG. 3, article 10 further includes a second impact-resistant substrate 40 bonded to the other side of polarizer 20, or alternatively to cellulosic layer 30 so that polarizer 20 is surrounded by substrates 40.

Article 10 is thermoformed to a desired curvature using conventional thermoforming techniques, resulting in a convex side 50 and a concave side 52. In an example embodiment, an optional hardcoat layer 60 is formed on one or both sides 50 and 52 of article 10, as illustrated in FIG. 2, to protect the article, e.g., when the article is used as a lens.

A popular substrate 40 used in contemporary eyewear is polycarbonate, sold under the tradename LEXAN by the General Electric Corporation, and sold under the tradename MACROLON by the Bayer Corporation. Polycarbonate has a glass transition temperature in the range between 135° C. to 155° C.

A substrate 40 with a suitable glass transition temperature can also be formed by copolymerizing two or more polymers. For example, U.S. Pat. No. 5,654,380, which patent is incorporated by reference herein, discloses a material made of aliphatic polyester-carbonates incorporating "diaryl carbonates" having a melting points from 70° C. to 180° C. Example 1 of U.S. Pat. No. 5,654,380 cites a specific copolymer with a melting point of 104° C. It is worth noting here that the glass transition temperature Tg of a polymer is typically slightly lower than its melting point.

Another example of a suitable copolymer substrate 40 is disclosed in U.S. Pat. No. 5,410,014, which patent is incorporated herein by reference. U.S. Pat. No. 5,410,014 discloses a copolymer of aromatic-aliphatic polycarbonate wherein the aromatic part is bisphenol A polycarbonate, the end molecular weight is preferably 19K to 65K, and the glass transition temperature is 119° C.

Conventional thermoforming requires that the temperature of the material being thermoformed be higher than the glass transition temperature. In some instances, thermoforming can be carried out at temperatures slightly below the glass transition temperature by using a pressure-assisted method. However even employing a pressure-assisted method, a temperature of at least 140° C. is required to adequately thermoform pure polycarbonate.

Another disadvantage of the pressure-assisted method is that substantial stress is induced into the thermoformed product. A further disadvantage is that at typical thermoforming temperatures, iodine-based polarizers are degraded. This means that the polarizer used with conventional polycarbonate must be resistant to these higher temperatures. Currently, only certain materials such as dichroic dye, poly-vinylene, and polyacetelyne polarizers can meet these requirements.

In an example embodiment of the present invention, substrate 40 is a blend of polymers. The polymer blend is selected such that the glass transition temperature of the blend is lower than that of a pure polymer. Prior art teaches that polycarbonate can be blended with other polymers to raise the glass transition temperature and thus obtain higher temperature-resistant blends.

In an example embodiment, substrate 40 is a polymer blend of polycarbonate and polyethylene teraphthalate. A blend of 70 parts polycarbonate to 30 parts polyethylene teraphthalate (XYLEX) is believed to have a glass transition temperature of about 121 ° C. Sheets of this material can thus be thermoformed at temperatures between about 120 to about 140° C. However, as mentioned above, at the high end of this temperature range, iodine polarizers degrade. On the other hand, experiments have shown that at the lower end of this temperature range thermoforming is not uniform.

A blend of 50 parts polycarbonate to 50 parts polyethylene teraphthalate is has a glass transition temperature of approximately 87° C. This polymer blend is available as an experimental product from the General Electric Corporation under the trade name XYLEX. Sheets of this material can be readily thermoformed at 95° C. In thermoforming experiments with XYLEX, the curvature of the thermoformed product was uniform and matched the curvature surfaces 70 and 72 of thermoforming assembly 74 (FIG. 2).

In another example embodiment, substrate 40 includes a blend of methacrylate and butyldyene having a glass transition at about 100° C., so that the substrate can be thermoformed at a temperature in the vicinity of 100° C.

Figure 4:
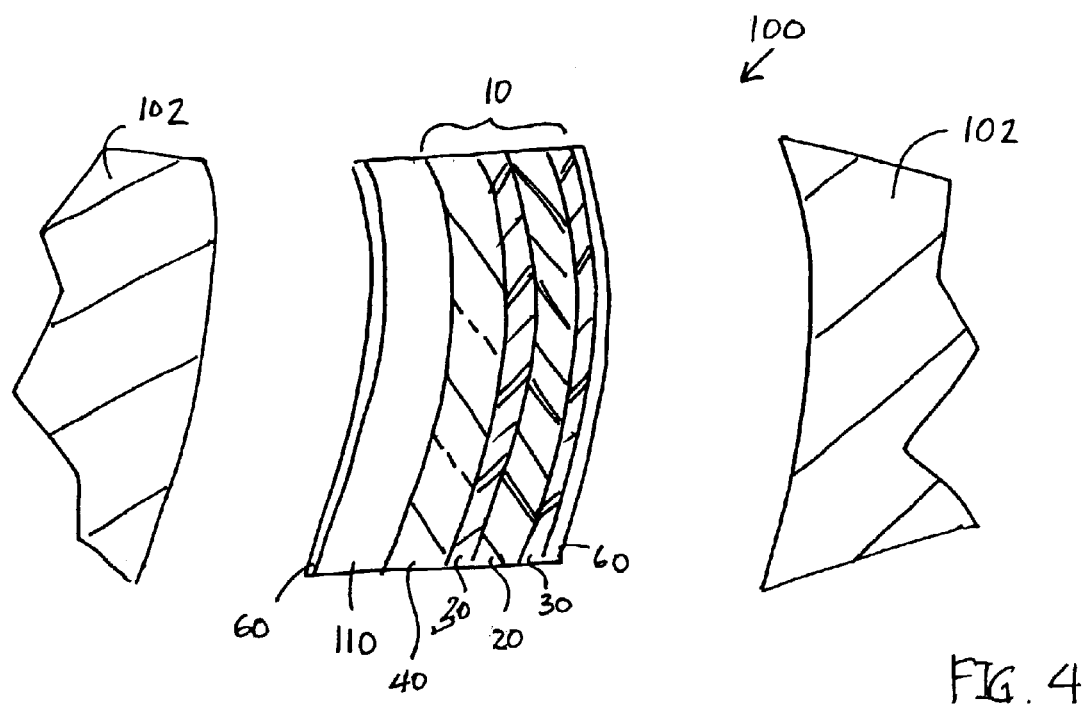

With reference to FIG. 4, in an example embodiment, article 10 is used as a polarizing insert to form an injection molded lens 100 using injection/compression coining process in an injection mold assembly 102. Lens 100 thus includes at least one layer 110 of high-impact polymer. In the example embodiment of FIG. 4, layer 110 is formed on the concave side 52 of article 10. In an example embodiment, high-impact polymer layer 110 is a blend of polycarbonate and polyethylene teraphthalate. In experiments, high-impact polymer layer bonded very well to article 10, and polarizer 20 did not degrade.

Figure 5:
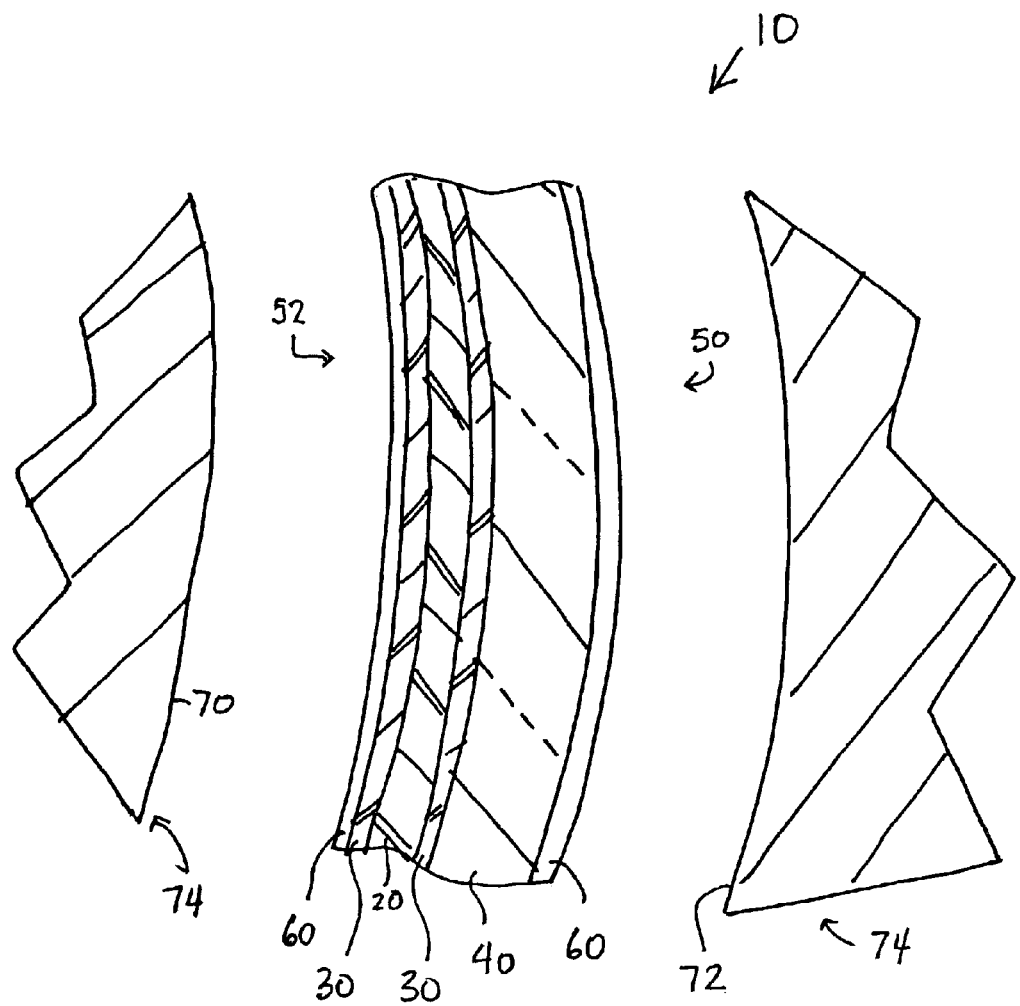
FIG. 5 is similar to FIG. 2 except that an injection molded layer is formed on the convex side of the substrate, and hard coat layers are formed on the inner and outer surfaces of the lens to form an impact-resistant and scratch-resistant lens.

Use of the injection/compression process of the Pope patent results in minimal stress in layer 110. The greatest impact strength for the polarizing lens 100 is obtained when the polarizer is placed toward the rear (eyeward or concave) side of the lens, as is shown in FIG. 5.

In an example embodiment, polarized lens 100 formed with a thickness of approximately 2.4 mm passes the American National Standards Institute (ANSI) Z87 Standard for Eye and Face Protection. The ANSI Z87 Standard involves the following tests:

Sec 15.1 High Velocity Test in which ¼ inch steel ball is propelled with a velocity of 150 ft. per sec. onto the lens Sec 15.2 High Mass Impact Test in which a 500 gram weight with a 30° conical tip is dropped onto the lens.

Sec Sec 15.5 Drop Ball Test in which a 1 inch diameter steel ball is dropped from a height of 50 inches onto the lens.

Sec 15.8.3 Needle Penetration Test in which a Singer sewing machine needle mounted in a 1.56 oz. holder is dropped on the lens from a height of 50 inches onto the lens.

Lenses thinner than 2.4 mm can also pass the above tests depending on the specific composition of the composite structure and the level of internal stress.

EXAMPLES

The following six Examples outline results obtained from different experiments to form example embodiments of article 10 of the present invention. The experiments were carried out to determine the proper process and structure for articles suitable for use as stand-alone polarized lenses, or as inserts for injection-molded polarized lenses.

Example 1

An iodine-based polarizer having transmittance for visible light of 37% was bonded between two layers of cellulose acetobutyrate, then bonded to one sheet (substrate) of 0.5 mm thick LEXAN polycarbonate to form the composite structure. Rectangles approximately 60 mm by 70 mm were cut from the composite structure. The composite rectangles were placed in a conventional vacuum thermoformer with spherical cups having a radius of 90 mm. The composite rectangles were heated in the thermoformer to 95° C. for 8 minutes. The curvature of the composite rectangles was very irregular and minimal. However the iodine-based polarizer did not show any degradation during the process. Similar results were obtained when the LEXAN polycarbonate sheets were replaced with sheets of polycarbonate from the Mobay Corp.

Example 2

An iodine-based polarizer having transmittance for visible light of 37% was bonded between two layers of cellulose acetobutyrate, then bonded to one sheet (substrate) of 0.5 mm thick LEXAN polycarbonate to form a composite structure. Rectangles approximately 60 mm by 70 mm were cut from the composite structure. The composite rectangles were placed in a conventional vacuum thermoformer with spherical cups having a radius of 90 mm. The composite rectangles were heated in the thermoformer to 140° C. for 8 minutes. The composite rectangles had an irregular curvature that was less than the mold surface curvature. The iodine polarizer was degraded and the cellulose acetobutyrate layers were yellowed and blistered. Similar results were obtained when the sheets of LEXAN polycarbonate were replaced with sheets of polycarbonate from the Mobay Corp.

Example 3

Rectangles approximately 60 mm by 70 mm were cut from a sheet (substrate) of 0.5 mm thick blend of 70/30 polycarbonate/polyethylene teraphthalate (XYLEX). The rectangles were placed in a conventional vacuum thermoformer with spherical cups having a radius of 90 mm. The rectangles were heated in the thermoformer to 120° C. for 8 minutes. The resultant curvature of the rectangles was irregular. Further, the polarizer showed slight degradation and the cellulose acetobutyrate showed slight yellowing.

Example 4

An iodine-based polarizer having transmittance for visible light of 37% was bonded between two layers of cellulose acetobutyrate, then bonded to one sheet (substrate) of 0.5 mm thick blend of 70/30 polycarbonate/polyethylene teraphthalate (XYLEX). Rectangles approximately 60 mm by 70 mm were cut from the composite structure. The composite rectangles were placed in a conventional vacuum thermoformer with spherical cups having a radius of 90 mm. The composite rectangles were heated in the thermoformer to 120° C. for 8 minutes. The resultant curvature of the rectangles was irregular. Further, the polarizer showed slight degradation and the cellulose acetobutyrate showed slight yellowing.

Example 5

An iodine-based polarizer having transmittance for visible light of 37% was bonded between two layers of cellulose acetobutyrate, then bonded to one sheet (substrate) of 0.5 mm thick blend of 50/50 polycarbonate/polyethylene teraphthalate (XYLEX). Rectangles approximately 60 mm by 70 mm were cut from the composite structure. The composite rectangles were placed in a conventional vacuum thermoformer with spherical cups having a radius of 90 mm. The composite rectangles were heated in the thermoformer to 100° C. for 8 minutes. The resultant curvature of the composite rectangles was regular and closely matched the curvature of the mold surface. Further, the iodine polarizer showed no degradation and the cellulose acetobutyrate layers did not yellow or blister. This article can be used as a stand-alone polarizing lens.

Example 6

An iodine-based polarizer having transmittance for visible light of 37% was bonded between two layers of cellulose acetobutyrate, then bonded to one layer (substrate) of 50/50 blend of polycarbonate/polyethylene teraphthalate (XYLEX). Rectangles approximately 60×70 mm were cut from the composite structure and were then heated in the thermoformer to 100° C. for 8 minutes. Upon removal from the thermoformer the curvature of the rectangles closely approximated the curvature of the mold surfaces and was uniform. This article was then used as an insert for an injection molded polarized lens.

Thus Article 10 can be used as a stand-alone polarized lens, or as a polarizing insert for forming a polarized lens. In one experiment, thermoformed article 10 was used as an insert to form a polarized lens. A blend of polycarbonate/polyethylene teraphthalate was injected on the convex side of the article to form layer 110, and the injection/compression coining process carried out to form polarized lens 100.

In an example embodiment, article 10 had the blend of polymers on the concave side of the substrate, as illustrated in FIG. 1. Article 10 was placed in injection mold assembly 102 and a high-impact polymer was injected onto the concave side of the article 10 to form layer 110. After the injection/compression coining process, the polarized lens 100 did not degrade and the bond between the insert and the injected polymer was very strong.

While the present invention has been described in connection with preferred embodiments, it will be understood that it is not so limited. On the contrary, it is intended to cover all alternatives, modifications and equivalents as may be included within the spirit and scope of the invention as defined in the appended claims.

What is claimed is:

1. An article, comprising:
a polarizer, and
a substrate coupled with the polarizer via bonding to form a composite structure, said
composite structure being thermoformed so as to form one of a plano polarized lens and
an ophthalmic powered polarized lens;
wherein the substrate is a blend of polycarbonate and polyethylene teraphthalate having a glass transition that allows the composite structure to be thermoformed at temperatures in the vicinity of 100°.

2. An article, comprising:
a polarizer, and
a substrate coupled with the polarizer via bonding to form a composite structure, said
composite structure being thermoformed so as to form one of a plano polarized lens and
an ophthalmic powered polarized lens;
wherein the substrate includes a blend of methacrylate and butyldyene having a glass transition that allows the composite structure to be thermoformed at temperatures in the vicinity of 100°.

3. A polarized lens product formed by a process comprising the steps of:
providing a polarizer;
coupling the polarizer to a substrate via bonding so as to form a composite structure, wherein the substrate comprises a blend of polycarbonate and polyethylene teraphthalate having a glass transition temperature that allows the composite structure to be thermoformed at temperatures in the vicinity of 100° C.; and
thermoforming the composite structure so as to result in the formation of one of a plano polarized lens and an ophthalmic powered polarized lens.

4. A polarized lens product formed by a process comprising the steps of:
providing a polarizer:
coupling the polarizer to a substrate via bonding so as to form a composite structure, wherein the substrate comprises a blend of methacrylate and butyldyene having a glass transition temperature that allows the composite structure to be thermoformed at temperatures in the vicinity of 100° C.; and
thermoforming the composite structure so as to result in the formation of one of a plano polarized lens and an ophthalmic powered polarized lens.

* * * * *